United States Patent [19]
Tsai et al.

[11] Patent Number: 5,948,079
[45] Date of Patent: Sep. 7, 1999

[54] SYSTEM FOR NON-SEQUENTIAL TRANSFER OF DATA PACKET PORTIONS WITH RESPECTIVE PORTION DESCRIPTIONS FROM A COMPUTER NETWORK PERIPHERAL DEVICE TO HOST MEMORY

[75] Inventors: Din-I Tsai, Fremont; Jeffrey R. Dwork, San Jose, both of Calif.

[73] Assignee: Advanced Micro Devices, Inc., Sunnyvale, Calif.

[21] Appl. No.: 08/994,807

[22] Filed: Dec. 19, 1997

[51] Int. Cl.⁶ ...................................................... G06F 7/10
[52] U.S. Cl. ................... 710/20; 370/389; 710/4; 710/7; 710/33
[58] Field of Search ................... 370/384, 469; 710/7, 4, 20, 33; 711/5

[56] References Cited

U.S. PATENT DOCUMENTS

| | | | |
|---|---|---|---|
| 5,010,546 | 4/1991 | Kato | 370/469 |
| 5,398,245 | 3/1995 | Harriman, Jr. | 370/389 |
| 5,523,999 | 6/1996 | Takano et al. | 370/389 |
| 5,752,078 | 5/1998 | Delp et al. | 710/7 |
| 5,778,414 | 7/1998 | Winter et al. | 711/5 |

*Primary Examiner*—Thomas C. Lee
*Assistant Examiner*—Chren Yuan
*Attorney, Agent, or Firm*—Monica H. Choi

[57] ABSTRACT

A computer network peripheral device transfers received data packets to a storage unit of a host computer system on a nonsequential data packet portion by portion basis instead of a sequential whole data packet by whole data packet basis of the prior art. Any received data packet is segmented into a plurality of data packet portions, and the data packet portions may be transferred in a nonsequential order. Such nonsequential transfer of data packet portions to the storage unit of the host computer system may optimize efficient data processing of the data packets by the host computer system.

15 Claims, 3 Drawing Sheets

5,948,079

SYSTEM FOR NON-SEQUENTIAL TRANSFER OF DATA PACKET PORTIONS WITH RESPECTIVE PORTION DESCRIPTIONS FROM A COMPUTER NETWORK PERIPHERAL DEVICE TO HOST MEMORY

TECHNICAL FIELD

This invention relates to computer network peripheral devices, and more particularly, to such a device that transfers data packets to the host memory in non-sequential portions.

BACKGROUND OF THE INVENTION

Referring to FIG. 1, a network of computers 100 includes a first computer 102, a second computer 104, a third computer 106, and a fourth computer 108 interconnected to each other via a linking network 110. A computer network peripheral device 112 is within the first computer 102 to provide added functionality to the first computer 102. The computer network peripheral device 112 may be an Ethernet computer network peripheral device which allows the first computer 102 to communicate with the other computers 104, 106, and 108 via the linking network 110. The first computer 102 is a host computer system to the computer network peripheral device 112.

The computer network peripheral device 112 receives data packets for the host computer system 102 via the linking network 110 from another computer in the computer network 100. Alternatively, the computer network peripheral device 112 also transmits data packets from the host computer system 102 via the linking network 110 to another computer in the computer network 100. In the case the computer network peripheral device 112 receives data packets, such received data packets are written into a storage unit 114 of the host computer system 102 for further processing of such received data packets by the host computer system 102. The storage unit 114 may be any data storage device such as a RAM (Random Access Memory). The computer network peripheral device receives or transmits data packets according to standard data communications protocols for computer networks such as the IEEE 802.3 or the DIX Ethernet data communications protocols as is known to one of ordinary skill in the art.

Referring to FIG. 2, a format for a data packet 200 is shown which may be according to the IEEE 802.3 or the DIX Ethernet data communications protocols. Such a format includes a header field 202 which includes a destination address field 204, a source address field 206, and a length/type field 208. The destination address field 204 is comprised of six bytes of information indicating the address of a computer or computers within the computer network 100 that are intended recipients of the data packet 200. The source address field 206 is comprised of six bytes of information indicating the address of the computer within the computer network 100 that transmitted the data packet 200.

The length/type field 208 is comprised of two bytes of information for indicating the number of bytes in protocol header and data fields 209 and 210 respectively of the data packet 200. Alternatively, the length/type field 208 may contain information for indicating the type of computer network communications protocol for which the data packet 200 is formatted. The protocol header field 209 and the protocol data field 210 are typically comprised of between 46 and 1500 bytes of data information. The protocol header field 209 may contain information regarding data within the protocol data field 210 according to another data communications protocol for formatting data within the protocol data field 210. The FCS (Frame Check Sequence) field 212 includes a checksum that has been generated by the computer transmitting the data packet 200. This checksum is read by the computer receiving the data packet 200 to determine if any data within the data packet 200 has been corrupted. The format of data packet 200 of FIG. 2 is by way of example only, and one of ordinary skill in the art may practice the present invention for any other data packet format.

Referring to FIG. 1, when the computer peripheral device 112 receives the data packet 200, the data packet 200 is transferred to the storage unit 114 of the host computer system 102 for further processing. In a conventional computer network peripheral device, the whole data packet upon reception by the computer peripheral device 112 is sequentially transferred to the storage unit 114. If multiple data packets were to be received by the computer network peripheral device, each such data packet is sequentially transferred in entirety to the storage unit 114 before another data packet is then sequentially transferred in entirety to the storage unit 114 in a conventional computer network peripheral device.

However, such sequential transfer on a whole data packet by whole data packet basis may slow down the processing of data packets by the host computer system 102. Such a sequential transfer on a whole data packet by whole data packet basis may take a longer time to transfer a plurality of data packets to the host computer system 102. In addition, the host computer system may not require a portion of a data packet for processing that data packet. Thus, in the sequential transfer of a whole data packet by whole data packet, processing time is wasted in transferring the whole data packet even when the whole data packet may not be required.

SUMMARY OF THE INVENTION

Accordingly, a primary object of the present invention is to speed up the processing of data packets received by a computer network peripheral device by transferring portions of the data packets to a host computer system in a nonsequential order.

In a general aspect of the present invention, a computer network peripheral device receives a plurality of data packets from a network of computers and transfers the data packets to a storage unit of a host computer system. The computer network peripheral device includes a respective register for storing each of the plurality of data packets received from the network of computers and includes a data packet portioning unit, coupled to the respective register, for portioning each of the plurality of data packets within the respective register into a plurality of data packet portions. The computer network peripheral device also includes a buffer writer, coupled to the data packet portioning unit and the storage unit of the host computer system, for transferring the data packet portions of the plurality of data packets to the storage unit of the host computer system in nonsequential order.

In other aspects of the present invention, the computer network peripheral device may also include a descriptor writer, coupled to the data portioning unit and the storage unit of the host computer system, for writing a respective description of a data packet portion, that is transferred to a respective receiving buffer, in a respective receiving descriptor within the storage unit of the host computer system. A respective receiving descriptor corresponds to a respective receiving buffer for a data packet portion. The description of a data packet portion may include respective content and respective buffer location information corresponding to the data packet portion.

The present invention may be used to particular advantage when the buffer writer transfers a respective predetermined data packet portion of each of the plurality of data packets to a respective receiving buffer within the storage unit of the host computer system before transferring a respective remaining portion of each of the plurality of data packets. In that case, the host computer system processes the respective predetermined data packet portion to determine desirability of the respective remainder data packet portion. The host computer system controls the buffer writer to not transfer the respective remaining data packet portion when the respective remaining data packet portion is undesirable.

Alternatively, the host computer system processes the respective predetermined data packet portions to determine an order of transferring the respective remainder data packet portions. The host computer system then controls the buffer writer to transfer the respective remaining data packet portions in that order.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference numeral in FIGS. 1–4 refer to the same element.

DETAILED DESCRIPTION

Figure 1:
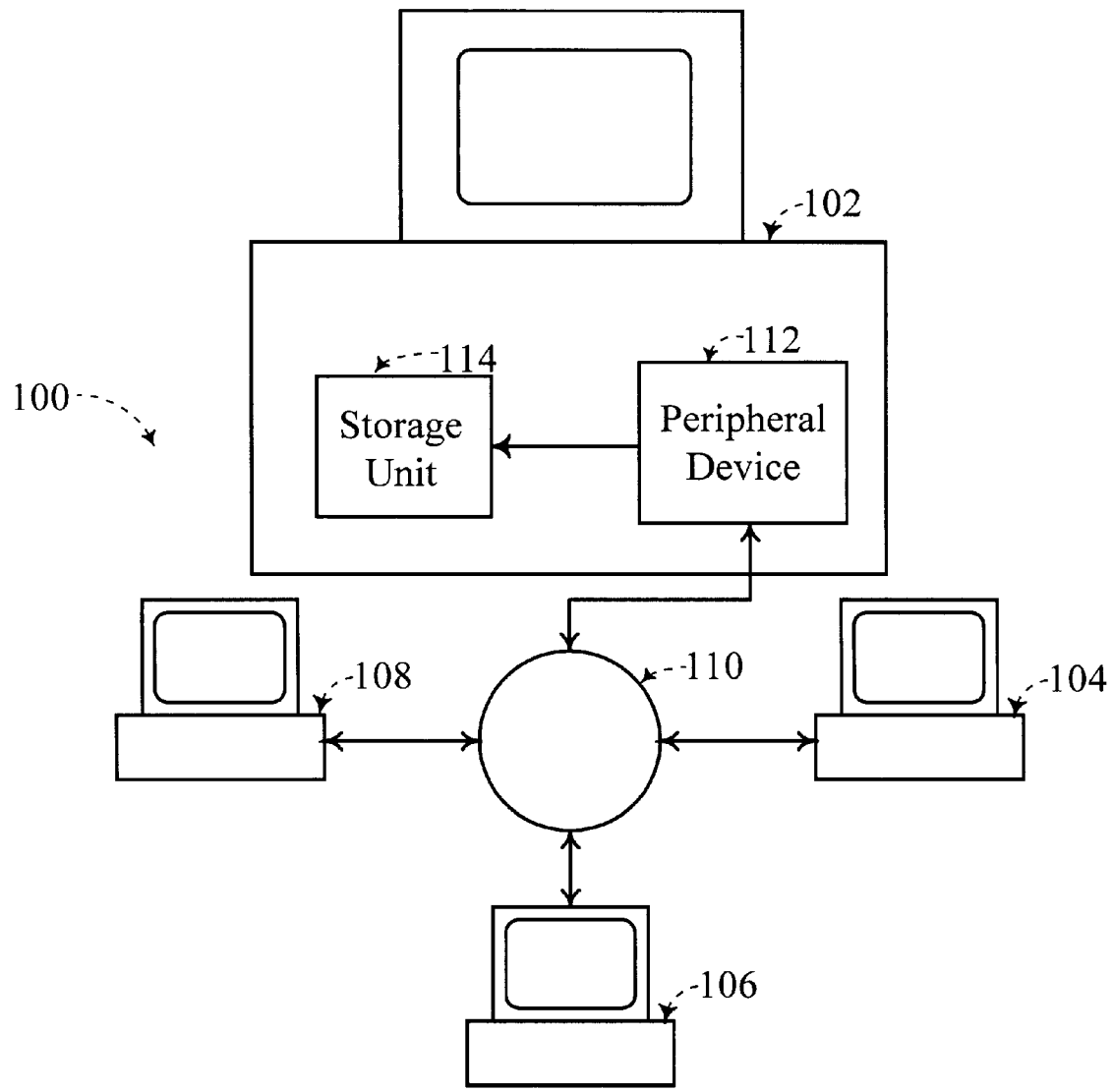
FIG. 1 shows a computer network peripheral device within a host computer system that is part of a network of computers.
Figure 3:
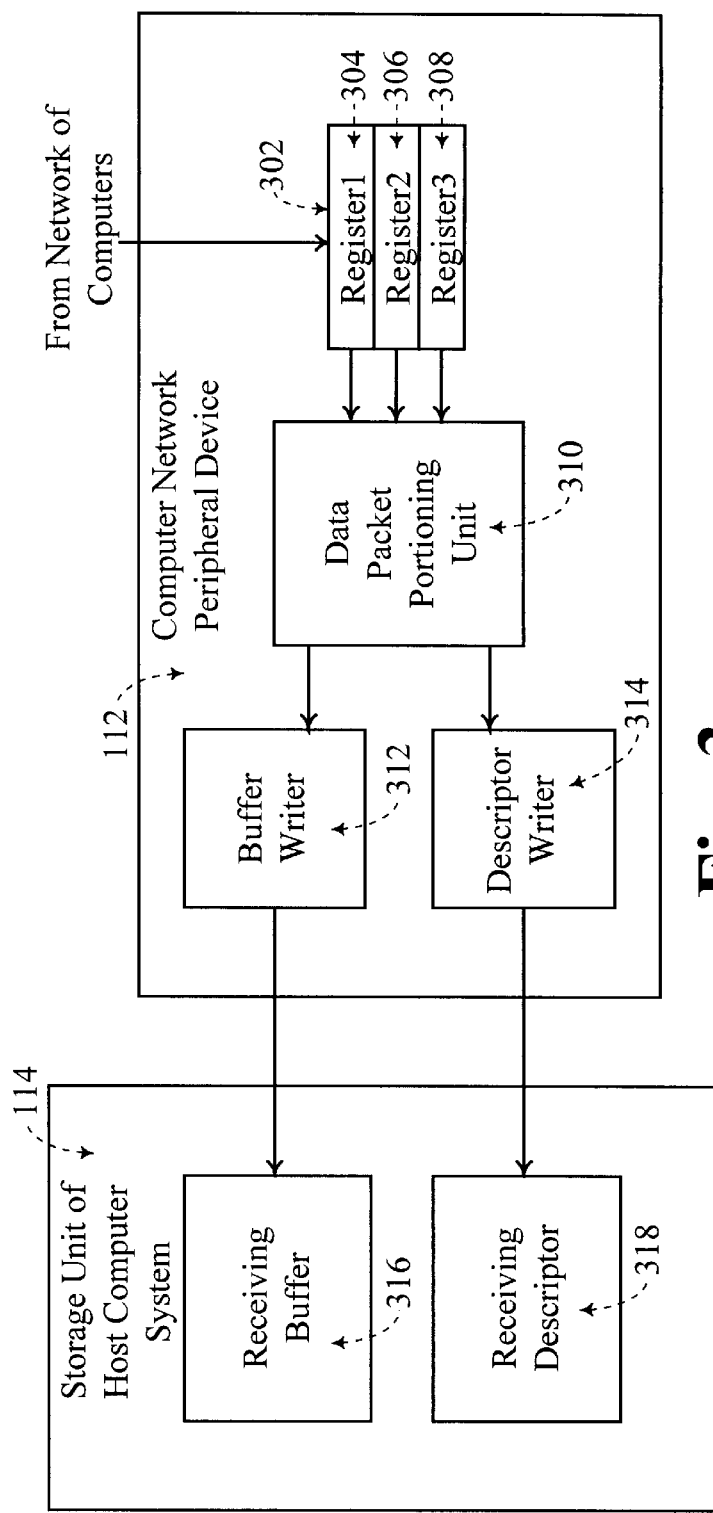
FIG. 3 shows components of a computer network peripheral device for transferring data packet portions to a storage unit of a host computer system in a nonsequential manner, according to a preferred embodiment of the present invention.

Referring to FIG. 3, the computer network peripheral device 112 according to a preferred embodiment of the present invention includes a plurality of registers 302 for storing a data packet received at the first computer 102 from the network of computers 100 of FIG. 1. A respective register stores a respective data packet. A first register 304 stores a first data packet, a second register 306 stores a second data packet, and a third register 308 stores a third data packet. A register may be any data storage device such as a SRAM (Static Random Access Memory).

A data packet portioning unit 310 is coupled to the plurality of registers 302 and portions each data packet into a plurality of data packet portions. The data packet portioning unit 310 is coupled to a buffer writer 312 and a descriptor writer 314. The buffer writer 312 writes a data packet portion into a receiving buffer 316 of the storage unit 114 of the host computer system 102 of FIG. 1. The descriptor writer 314 writes into a receiving descriptor 318 a respective description of a data packet portion that has been written into the receiving buffer 316. This respective description may include content and receiving buffer location information for a corresponding data packet portion.

Figure 4:
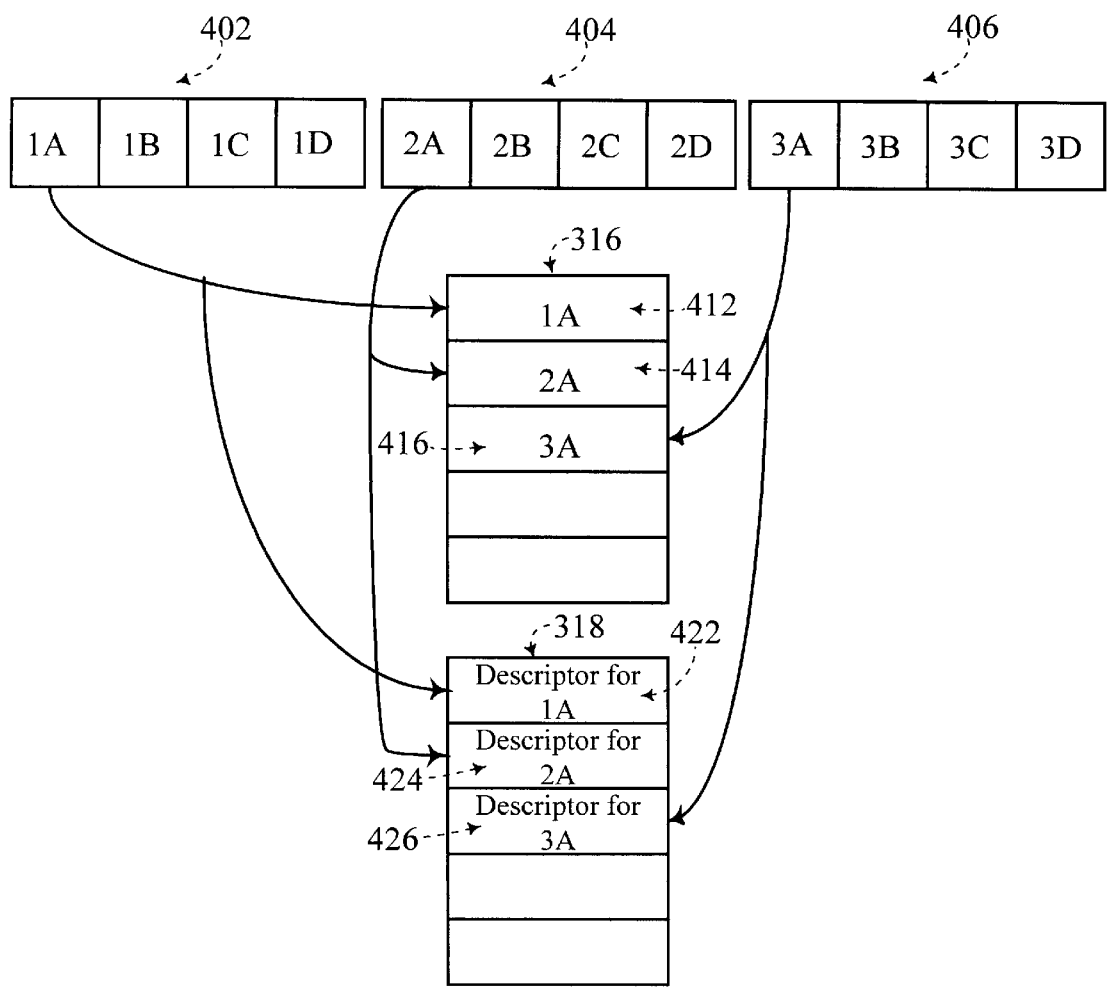
FIG. 4 illustrates the nonsequential transfer of data packet portions to the storage unit of the host computer system by the computer network peripheral device of FIG. 3, according to a preferred embodiment of the present invention.

The operation of the computer network peripheral device 112 according to a preferred embodiment of the present invention is now described. Referring to FIG. 4, a first data packet 402, a second data packet 404, and a third data packet 406 are received by the computer network peripheral device 112. The first, second, and third data packets 402, 404, and 406 respectively may be stored in the first, second, and third registers, 304, 306, and 308 respectively.

The data packet portioning unit 310 segments each data packet into a plurality of data packet portions. For example, the first data packet 402 is segmented into a first portion labeled 1A, a second portion labeled 1B, a third portion labeled 1C, and a fourth portion labeled 1D. The second data packet 404 is segmented into a first portion labeled 2A, a second portion labeled 2B, a third portion labeled 2C, and a fourth portion labeled 2D. The third data packet 406 is segmented into a first portion labeled 3A, a second portion labeled 3B, a third portion labeled 3C, and a fourth portion labeled 3D.

The buffer writer 312 transfers a data packet portion to the receiving buffer 316 of the storage unit 114 of the host computer system 102. The data comprising the first, second, and third data packets 402, 404, and 406 are transferred nonsequentially on a data packet portion by portion basis instead of on a whole data packet by whole data packet basis of the prior art. For example, the first portion 1A of the first data packet 402 may be transferred to the storage unit 114 followed by the transferring of the first portion 2A of the second data packet 404 to the storage unit 114.

A respective receiving buffer within the storage unit 114 stores a respective data packet portion. For example in FIG. 4, a first receiving buffer 412 stores the first portion 1A of the first data packet 402, a second receiving buffer 414 stores the first portion 2A of the second data packet 404, and a third receiving buffer 416 stores the first portion 3A of the third data packet 406. The buffer writer 316 writes a data packet portion into a respective receiving buffer corresponding to that data packet.

In addition, the descriptor writer 314 writes a respective description of a data packet portion into a respective descriptor 318 within the storage unit 114 of the host computer system 102. For example, a first descriptor 422 includes a description for the first portion 1A of the first data packet 402, a second descriptor 424 includes a description for the first portion 2A of the second data packet 402, and a third descriptor 426 includes a description for the first portion 3A of the third data packet 406. In this manner, a respective descriptor corresponds to a respective receiving buffer for a data packet portion.

By thus transferring data packets on a nonsequential portion by portion basis, processing of the data packets by the host computer system 102 may be more efficient. The time for transferring a smaller data packet portion from the computer network peripheral device 112 to the host computer system storage unit 114 is less than for transferring the whole data packet. Thus, host computer system 102 may begin to process the data packets earlier by processing the transferred data packet portions.

Figure 2:
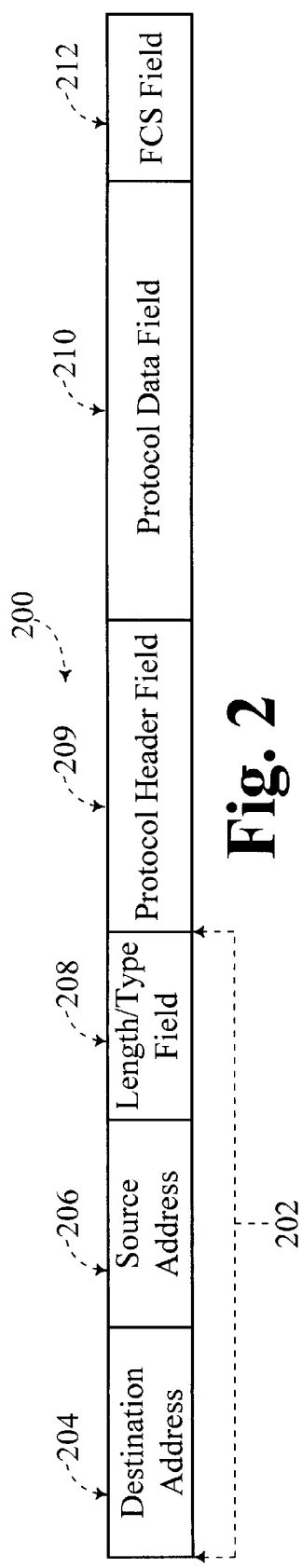
FIG. 2 shows an example format of a data packet used for communication of data within the network of computers of FIG. 1.

In addition, the information within a predetermined data packet portion may be sufficient for the host computer system 102 to substantively process a data packet. For example, in the example of FIG. 4, the first portions 1A, 2A, and 3A of the first, second, and third data packets 402, 404, and 406 respectively may be a respective header field (202 in FIG. 2) of each of the data packets 402, 404, and 406. Alternatively, the first portions 1A, 2A, and 3A of the first, second, and third data packets 402, 404, and 406 respectively may be the respective protocol header field (209 in FIG. 2) of each of the data packets 402, 404, and 406. In either case, the host computer system 102 may determine the desirability of a remainder data packet portion of a data packet from the predetermined data packet portion of that data packet.

For example, referring to FIG. 4, assume that the first portion 1A within the first receiving buffer 412 is the protocol header field (209 in FIG. 2) of the first data packet 402. The host computer system 102 then may determine from the information within the protocol header field 209 that the remainder portion of the first packet 402 including the second, third, and fourth portions 1B, 1C, and 1D respectively are not desired for further processing. In that case, the host computer system 102 controls the buffer writer 312 to not transfer the remainder portion of the first data packet 402. In this manner, data processing resource has been conserved in avoiding transfer of undesired data from the computer network peripheral device 112 to the host computer system 102.

As an additional example, the host computer system 102 may determine an order of transferring the remainder data packet portions from processing the transferred predetermined data packet portions. Referring to FIG. 4, the host computer system 102 from the first portions 1A, 2A, and 3A of the first, second, and third data packets 402, 404, and 406 respectively, may determine a desired order in which the remainder portions of the first, second, and third data packets 402, 404, and 406 are to be transferred to the storage unit 114 of the host computer system 102. Such a desired order may optimize data processing of the data packets. The remainder portions of the first data packet 402 include the second portion 1B, the third portion 1C, and the fourth portion 1D of the first data packet 402. The remainder portions of the second data packet 404 include the second portion 2B, the third portion 2C, and the fourth portion 2D of the second data packet 404. The remainder portions of the third data packet 406 include the second portion 3B, the third portion 3C, and the fourth portion 3D of the third data packet 406. The host computer system 102 may then control the buffer writer 312 to write the remainder data packet portions in the order determined by the host computer system 102 for optimized processing of the data packets 402, 404, and 406.

In this manner, by transferring received data packets from the computer network peripheral device 112 to the storage unit 114 of the host computer system 102 on a nonsequential data packet portion by portion basis, processing of the data packets within the host computer system may be optimized for efficient processing. The present invention may be used to particular advantage in this manner as data packets are received at a faster speed as computer network peripheral device technology and data communications technology improve with time from 10 Megabit per second reception to 100 Megabit per second and Gigabit per second reception. For slower reception, the bottleneck in speed of data communications and processing may be in the reception of the data packets. However, for faster reception, the bottleneck in speed for data communications and processing may shift to processing of the data packets upon reception. In that case, the present invention which may optimize data processing by transferring data packet portions in a nonsequential order may be even more critical for providing more efficient processing of data packets upon reception. In addition, with faster data reception, the host computer system may not be amenable for an interrupt at a reception of each data packet. In that case, a plurality of data packets may be batched together for a single interrupt and transfer of the batch of data packets to the host computer system. The present invention may be used to particular advantage for portioning these data packets within a batch for transfer of such data packet portions to the host computer in a nonsequential order for optimized data processing.

The foregoing is by way of example only and is not intended to be limiting. For example, the present invention may be implemented for any number of data packets received at the computer network peripheral device. Moreover, a data packet may be segmented into any number of data packet portions of any size. More importantly, the host computer system may process the data packets portions in any manner for more efficient processing of data packets. The invention is limited only as defined in the following claims and equivalents thereof.

We claim:

1. A computer network peripheral device, for receiving a plurality of data packets from a network of computers to transfer said data packets to a storage unit of a host computer system, said computer network peripheral device comprising:

a respective register for storing each of the plurality of data packets received from the network of computers;

a data packet portioning unit, operatively coupled to the respective register, for portioning each of the plurality of data packets into a plurality of data packet portions;

a buffer writer, operatively coupled to the data packet portioning unit and the storage unit of the host computer system, for transferring the data packet portions of the plurality of data packets to the storage unit of the host computer system in a nonseguential order; and a descriptor writer, operatively coupled to the data portioning unit and the storage unit of the host computer system, for writing a respective description of a data packet portion, that is transferred to a respective receiving buffer in the storage unit, in a respective receiving descriptor within the storage unit of the host computer system, a respective receiving descriptor corresponding to a respective receiving buffer for a data packet portion.

2. The computer network peripheral device of claim 1, wherein the description of a data packet portion includes respective content and respective buffer location information corresponding to the data packet portion.

3. A computer network peripheral device, for receiving a plurality of data packets from a network of computers to transfer said data packets to a storage unit of a host computer system, said computer network peripheral device comprising:

a respective register for storing each of the plurality of data packets received from the network of computers;

a data packet portioning unit, operatively coupled to the respective register, for portioning each of the plurality of data packets into a plurality of data packet portions; and a buffer writer, operatively coupled to the data packet portioning unit and the storage unit of the host computer system, for transferring the data packet portions of the plurality of data packets to the storage unit of the host computer system in a nonseguential order;

and wherein the buffer writer transfers a respective predetermined data packet portion of each of the plurality of data packets to a respective receiving buffer within the storage unit of the host computer system before transferring a respective remaining portion of each of the plurality of data packets;

and wherein the host computer system processes the respective predetermined data packet portion to determine desirability of the respective remainder data packet portion, and wherein said host computer system controls the buffer writer to not transfer the respective remaining data packet portion when the respective remaining data packet portion is undesirable.

4. A computer network peripheral device, for receiving a plurality of data packets from a network of computers to transfer said data packets to a storage unit of a host computer system, said computer network peripheral device comprising:

a respective register for storing each of the plurality of data packets received from the network of computers;

a data packet portioning unit, operatively coupled to the respective register, for portioning each of the plurality of data packets into a plurality of data packet portions;

a buffer writer, operatively coupled to the data packet portioning unit and the storage unit of the host computer system, for transferring the data packet portions of the plurality of data packets to the storage unit of the host computer system in a nonsequential order;

and wherein the buffer writer transfers a respective predetermined data packet portion of each of the plurality of data packets to a respective receiving buffer within the storage unit of the host computer system before transferring a respective remaining portion of each of the plurality of data packets;

and wherein the host computer system processes the respective predetermined data packet portions to determine an order of transfer of the respective remainder data packet portions, and wherein the host computer system controls the buffer writer to transfer the respective remaining data packet portions in said order of transfer.

5. A computer network peripheral device, for receiving a plurality of data packets from a network of computers to transfer said data packets to a storage unit of a host computer system, said computer network peripheral device comprising:

a respective register for storing each of the plurality of data packets received from the network of computers;

a data packet portioning unit, operatively coupled to the respective register, for portioning each of the plurality of data packets within the respective register into a plurality of data packet portions;

a buffer writer, operatively coupled to the data packet portioning unit and the storage unit of the host computer system, for transferring the data packet portions to the storage unit of the host computer system, in a nonsequential order, wherein the buffer writer transfers a respective predetermined data packet portion of each of a plurality of data packets to a respective receiving buffer within the storage unit of the host computer system before transferring a respective remaining portion of each of the plurality of data packets, wherein the host computer system processes the respective predetermined data packet portion to determine desirability of the respective remainder data packet portion, and wherein said host computer system controls the buffer writer to not transfer the respective remaining data packet portion when the respective remaining data packet portion is undesirable; and a descriptor writer, operatively coupled to the data portioning unit and the storage unit of the host computer system, for writing a respective description of a data packet portion, that is transferred to a respective receiving buffer, in a respective receiving descriptor within the storage unit of the host computer system, a respective receiving descriptor corresponding to a respective receiving buffer for a data packet portion, wherein the respective description of a data packet portion includes respective content and respective buffer location information corresponding to the data packet portion.

6. A computer network peripheral device, for receiving a plurality of data packets from a network of computers to transfer said data packets to a storage unit of a host computer system, said computer network peripheral device comprising:

means for portioning each of the data packets into a plurality of data packet portions;

means for transferring the data packet portions to the storage unit of the host computer system in a nonsequential order; and means for writing a respective description of a data packet portion, that is transferred to a respective receiving buffer, in a respective receiving descriptor within the storage unit of the host computer system, a respective receiving descriptor corresponding to a respective receiving buffer for a data packet portion.

7. The computer network peripheral device of claim 6, wherein the description of a data packet portion includes respective content and respective buffer location information corresponding to the data packet portion.

8. The computer network peripheral device of claim 6, wherein a respective predetermined data packet portion of each of the plurality of data packets is transferred to a respective receiving buffer within the storage unit of the host computer system before a respective remaining portion of each of the plurality of data packets is transferred to the storage unit of the host computer system.

9. The computer network peripheral device of claim 8, wherein the host computer system processes the respective predetermined data packet portion to determine desirability of the respective remainder data packet portion, and wherein the respective remaining data packet portion is not transferred to the storage unit of the host computer system when the respective remaining data packet portion is undesirable.

10. The computer network peripheral device of claim 8, wherein the host computer system processes the respective predetermined data packet portions to determine an order of transfer of the respective remainder data packet portions, and the respective remaining data packet portions are transferred in said order of transfer.

11. A method for transferring a plurality of data packets received from a network of computers to a storage unit of a host computer system, said method including the steps of:

portioning each of the plurality of data packets from the network of computers into a plurality of data packet portions;

transferring the data packet portions to the storage unit of the host computer system in nonsequential order; and writing a respective description of a data packet portion, that is transferred to a respective receiving buffer, in a respective receiving descriptor within the storage unit of the host computer system, a respective receiving descriptor corresponding to a respective receiving buffer for a data packet portion.

12. The method of claim 11, wherein the description of a packet portion includes respective content and respective buffer location information corresponding to the data packet portion.

13. The method of claim 11, wherein the step of transferring a data packet portion further includes a step of:

transferring a respective predetermined data packet portion of each of a plurality of data packets to a respective receiving buffer within the storage unit of the host computer system before transferring a respective remaining portion of each of the plurality of data packets.

14. The method of claim 13, wherein the host computer system processes the respective predetermined data packet portion to determine desirability of the respective remainder data packet portion, and wherein the step of transferring a data packet portion further includes a step of:

not transferring the respective remaining data packet portion when the respective remaining data packet portion is undesirable.

15. The method of claim 13, wherein the host computer system processes the respective predetermined data packet portion to determine an order for transferring the respective remainder data packet portions, and wherein the step of transferring a data packet portion further includes a step of:

transferring the respective remaining data packet portions in said order.

\* \* \* \* \*